United States Patent
Flechsig et al.

(10) Patent No.: US 7,126,777 B2
(45) Date of Patent: Oct. 24, 2006

(54) DISK DRIVE WITH SELECTABLE POWER SOURCE FOR HEATER IN A SLIDER

(75) Inventors: Karl Flechsig, Los Gatos, CA (US); Mike Suk, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 93 days.

(21) Appl. No.: 10/903,988

(22) Filed: Jul. 30, 2004

(65) Prior Publication Data

US 2006/0023331 A1    Feb. 2, 2006

(51) Int. Cl.
*G11B 5/02*    (2006.01)
*G11B 21/02*    (2006.01)
*G11B 15/12*    (2006.01)

(52) U.S. Cl. .............................. 360/59; 360/75; 360/61
(58) Field of Classification Search ................. 360/59, 360/61
See application file for complete search history.

(56) References Cited

U.S. PATENT DOCUMENTS

| | | | |
|---|---|---|---|
| 5,991,113 A * | 11/1999 | Meyer et al. ................. 360/75 |
| 6,307,719 B1 | 10/2001 | Mallary |
| 6,577,466 B1 * | 6/2003 | Meyer et al. ................. 360/75 |
| 6,707,646 B1 | 3/2004 | Berger et al. |
| 6,757,125 B1 | 6/2004 | Vettiger et al. |
| 2002/0034035 A1 | 3/2002 | Vettiger et al. |
| 2002/0057511 A1 | 5/2002 | Kikitsu et al. |
| 2002/0191326 A1 * | 12/2002 | Xu et al. ...................... 360/75 |
| 2003/0035237 A1 | 2/2003 | Lille |
| 2003/0048559 A1 | 3/2003 | Jove et al. |
| 2003/0174430 A1 | 9/2003 | Takahasi et al. |
| 2004/0027728 A1 | 2/2004 | Coffey et al. |
| 2004/0190175 A1 * | 9/2004 | Chey et al. ................... 360/59 |
| 2005/0057841 A1 * | 3/2005 | Stover et al. ................. 360/59 |
| 2005/0105204 A1 * | 5/2005 | Bloodworth et al. ......... 360/75 |

FOREIGN PATENT DOCUMENTS

| | | |
|---|---|---|
| JP | 61-224110 A1 | 10/1986 |
| JP | 63-108504 A1 | 5/1988 |

* cited by examiner

*Primary Examiner*—Wayne Young
*Assistant Examiner*—Jason Olson
(74) *Attorney, Agent, or Firm*—G. Marlin Knight

(57) ABSTRACT

A disk drive with switchable power levels for the heaters in the sliders is disclosed. The invention includes a switch for the electrical circuit of each heater which selects between two or more voltages to apply to the power control element and the heater with at least a high and a low voltage option. The heater power control circuit dissipates a certain amount of heat as a part of the control process. By having a low voltage option the disk drive can save power and reduce the amount of heat dissipated by the heater control circuit when high power is not required. The programmable switch is controlled by the drive control system. The high power setting can be used during manufacturing testing or otherwise if higher heater power is needed. The low power setting is used for normal operation or to save power.

15 Claims, 3 Drawing Sheets

DISK DRIVE WITH SELECTABLE POWER
SOURCE FOR HEATER IN A SLIDER

FIELD OF THE INVENTION

The invention relates to disk drives with heaters in the sliders and more particularly to methods and means for controlling the power supplied to the heaters.

BACKGROUND OF THE INVENTION

A prior art magnetic disk drive 10 as illustrated in FIG. 1 a slider 13 containing magnetic transducers for reading and writing (not shown) magnetic transitions is urged toward the rotating disk 16 by a suspension (not shown). As the disk rotates an air-bearing develops under the slider and causes it to fly. The distance between the slider and the disk surface is the fly-height (FH). The term "air-bearing height" is used interchangeably with fly-height. The disk 16 typically includes a thin film overcoat 17 and a set of thin films 18 which include one or more ferromagnetic layers in which information is recorded. A disk drive can contain multiple disks and multiple sliders. The slider 13 contains heater 14 which is used to affect the fly-height of the slider by causing a local thermal expansion of the slider in the area where the read and write heads are located. The thermal expansion has the effect of pushing the heads closer to the disk and reducing the effective fly-height. A lower slider fly-height is required for higher areal densities. Fly-heights of less than 7 nm are currently needed. Each slider heater has an adjustable power control element (not shown) in series with it.

The manufacturing process for disk drives with thermal fly-height control includes a calibration process for the control loop for the thermal fly-height control can require a larger amount of heater power than is needed for normal operation. For example, it can be advantageous to over drive the heater to cause contact with the disk. However, the extra power requires a higher voltage supply to the power control element in series with the heater and when not being used results in a higher heat dissipation in the power control element.

In U.S. patent application 2003/0174430 by Takahasi, et al. a disk drive with heaters in the slider is described. The heaters include a heating coil and a thermal expansion element. Two heaters are disposed on opposite sides of the heads. A temperature sensor near the heads is included. The heating coils are electrically connected through the wirings disposed in the arm assembly to a power source and the control unit. Current is supplied from the power source to the coils under control of the control unit. The control unit has a fly-height detection unit, a fly-height control unit, a power supplying control unit, and a converting unit.

In U.S. patent application 2003/0035237 by Jeffrey Lille Feb. 20, 2003 an electro-thermal micromechanical actuator on a slider is disclosed. A movable member is etched into a face of a slider opposite the air-bearing surface of the slider. The movable member is substantially freestanding in relation to the slider, having only a single end connected to the slider. An electrically actuated heater element with two parallel current paths is disposed on the movable member. One of the current paths is substantially narrower than the other current path. When a current is passed through the heater element, the narrower current path heats up more quickly than the wider current path. By varying the current passed through the heater element in a selected manner, a distortion of the movable member is harnessed and used to create a relative motion in the slider body, allowing the slider to be quickly and exactly located over the centerline of a track of a storage device.

In U.S. patent application 2004/0027728 by Coffey et al. Feb. 12, 2004 a magnetic head for thermally-assisted writing of data to a disk is disclosed. In one embodiment, the magnetic head includes a write head element and a heating element which is a resistive infared radiator. The heating element is coupled to at least one via pad which is exposed on an outer surface of the magnetic head. The heating element is formed beneath or within the pole tip such that it is able to transfer heat to a portion of the disk before the write head element can write data to it.

SUMMARY OF THE INVENTION

A disk drive with switchable power levels for the heaters in the sliders is disclosed. The invention includes a switch for the electrical circuit of each heater which selects between two or more voltages to apply to the power control element and the heater with at least a high and a low voltage option. The heater power control circuit dissipates a certain amount of heat as a part of the control process. By having a low voltage option the disk drive can save power and reduce the amount of heat dissipated by the heater control circuit when high power is not required. The programmable switch is controlled by the drive control system. The high power setting can be used during manufacturing testing or otherwise if higher heater power is needed. The low power setting is used for normal operation or to save power.

DETAILED DESCRIPTION OF THE
INVENTION AND THE PREFERRED
EMBODIMENTS

Figure 1:
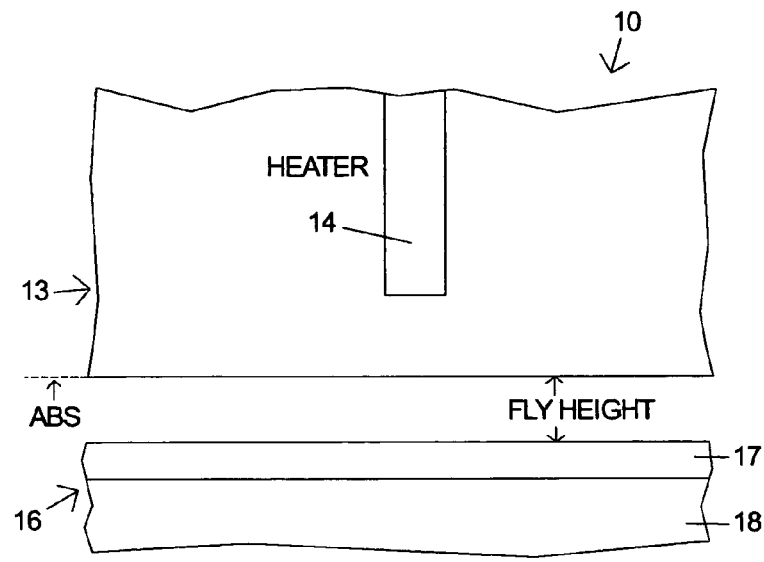
FIG. 1 is an illustration of selected components of a prior art disk drive illustrating the fly-height.
Figure 2:
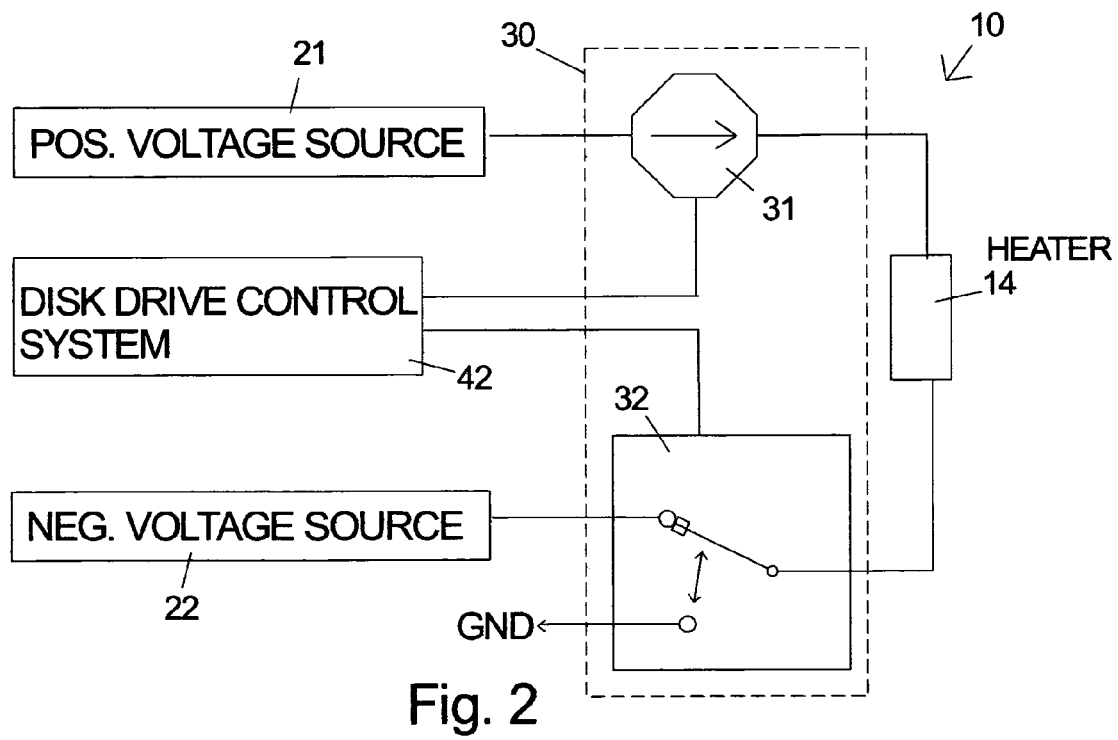
FIG. 2 is an illustration of a disk drive with voltage switching in the heater control circuit according to a first embodiment of the invention.

FIG. 2 illustrates a disk drive 10 with voltage switching in the heater control circuit 30 embodying the invention. Two voltage sources supplying a positive and negative voltage are used. Positive voltage source 21 is connected to adjustable power control device 31 which can be a voltage or a current control device. Negative voltage source 22 is connected to one side of a programmable switch 32 which is also connected to zero or ground voltage level. The switch 32 is shown symbolically and in practice will preferably be implemented in an integrated circuit which includes other arm electronic components which are located near the sliders, for example, in an integrated circuit located on a flex cable attached to the actuator. The programmable switch 32 is controlled by the disk drive's control system 42. The position of switch 32 determines whether the voltage across the adjustable control device 31 and the heater 14 is the voltage difference between positive voltage source 21 and zero or is the combined positive and negative voltages. For example, if positive voltage source 21 is a +5v and negative voltage source 22 is a −5v, then the position of switch 32 determines whether the heater control circuit has 5v drop or 10v drop. In this example, the amount of the voltage drop across the heater 14 will be the total voltage, 5v or 10v, minus the voltage drop across the adjustable control device 31. The switching can also be implemented between the positive voltage and the ground. Some drives have −3v and +5v and the invention will work with these and other voltages as well.

Figure 3:
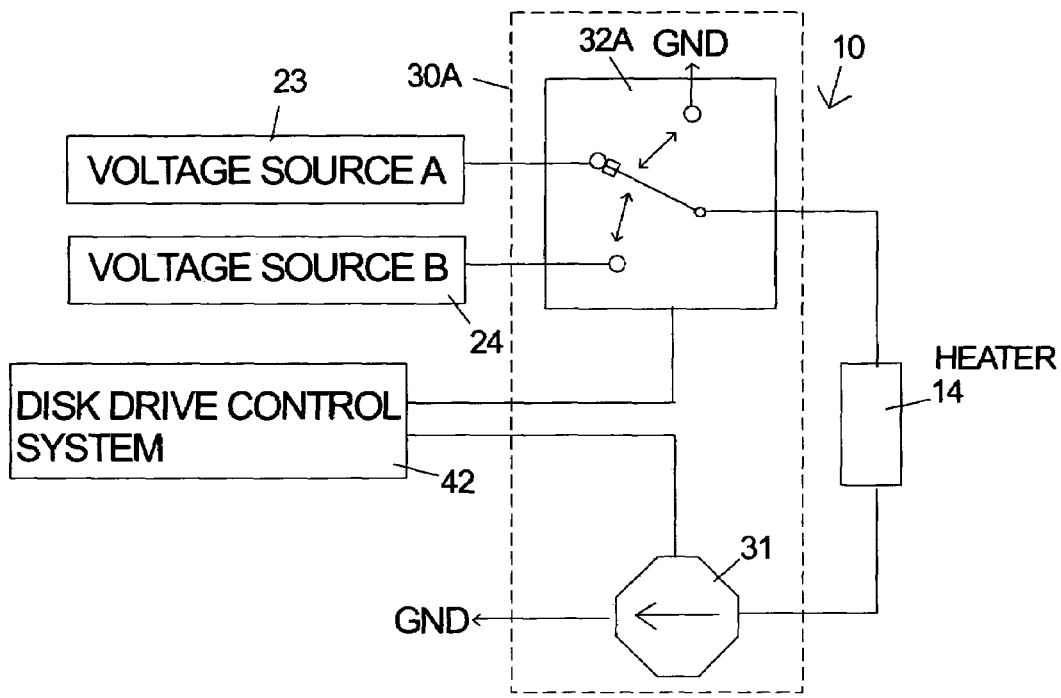
FIG. 3 is an illustration of a disk drive with voltage switching in the heater control circuit according to a second embodiment of the invention.

If two positive voltages are used then the switching should be between the two voltage sources 23, 24 as shown in FIG. 3. In this embodiment the heater control circuit 30A includes switch 32A to select either of the two supply voltages. Two negative voltages could similarly be used. Likewise, the switching can be implemented between any number of voltages to create a plurality of power ranges rather than just two. A switch position can also be included to cut off all power to the power control element if desired. The off position for the switch 32A could be implemented by having a third position on the switch with a ground connection.

The adjustable control device 31 can be any of the known programmable control devices used to control current or voltage. The adjustable control device 31 is connected to the disk drive's control system 42 so that the firmware can adjust the power applied to the heater 14 by adjusting the voltage or current as required to control the thermal protrusion of the slider and thereby the fly-height or spacing between the read and write elements and the magnetic media.

When the disk drive is in test mode or otherwise needs to have high power available to a specific heater, the control system 42 commands the programmable switch to connect the higher voltage to the heater control circuit. When disk drive is in normal operating mode or can use low power to a specific heater, the control system 42 commands the programmable switch to connect the lower voltage to the heater control circuit. Since there can be more than one heater in a slider, the switch and adjustable power control device can be duplicated for each heater or a single switch and adjustable power control device can be used for all of the heaters in a slider. Likewise since disk drives normally have multiple sliders, there must be at least one switch and adjustable power control device for each slider.

Figure 4:
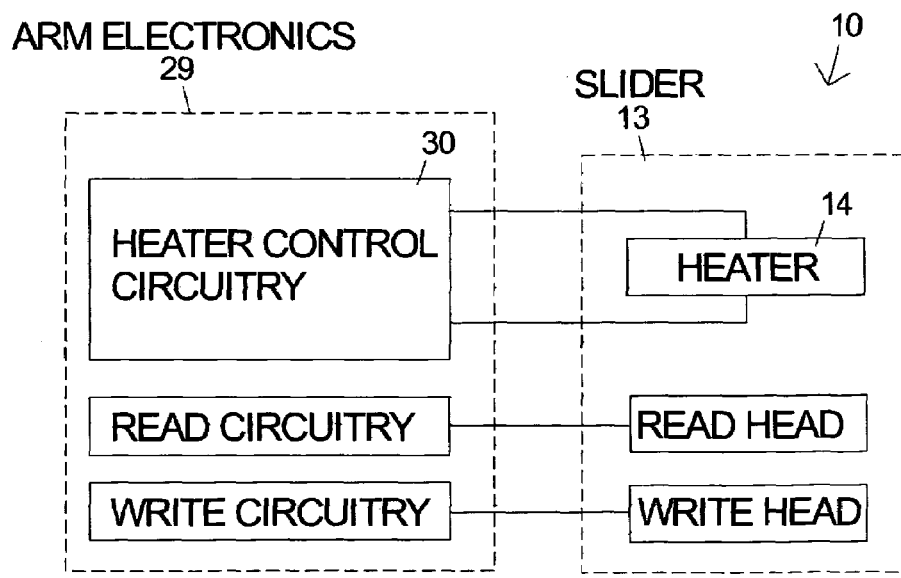
FIG. 4 is an illustration of a disk drive with voltage switching in the heater control circuit according to the invention showing the relationships between the arm electronics and the slider.

FIG. 4 is an illustration of disk drive 10 with the heater control circuit 30 according to the invention shown as a part of the arm electronics 29 which include Read Circuitry connected the Read Head and Write Circuitry connected to the Write Head. The arm electronics 29 are typically implemented in a single chip which is bonded to a flexible cable that contains the wiring to and from the slider and connects to disk drive's control system.

In one disk drive tested 70 mw of power was required for the disk contact during calibration as contrasted with 30 mw for normal operation. Therefore, the power switching of the invention could save up to 40 mw per heater in this drive. In applications such as laptop computers where power saving is important, the heater power switching of the invention can be particularly valuable.

Figure 5:
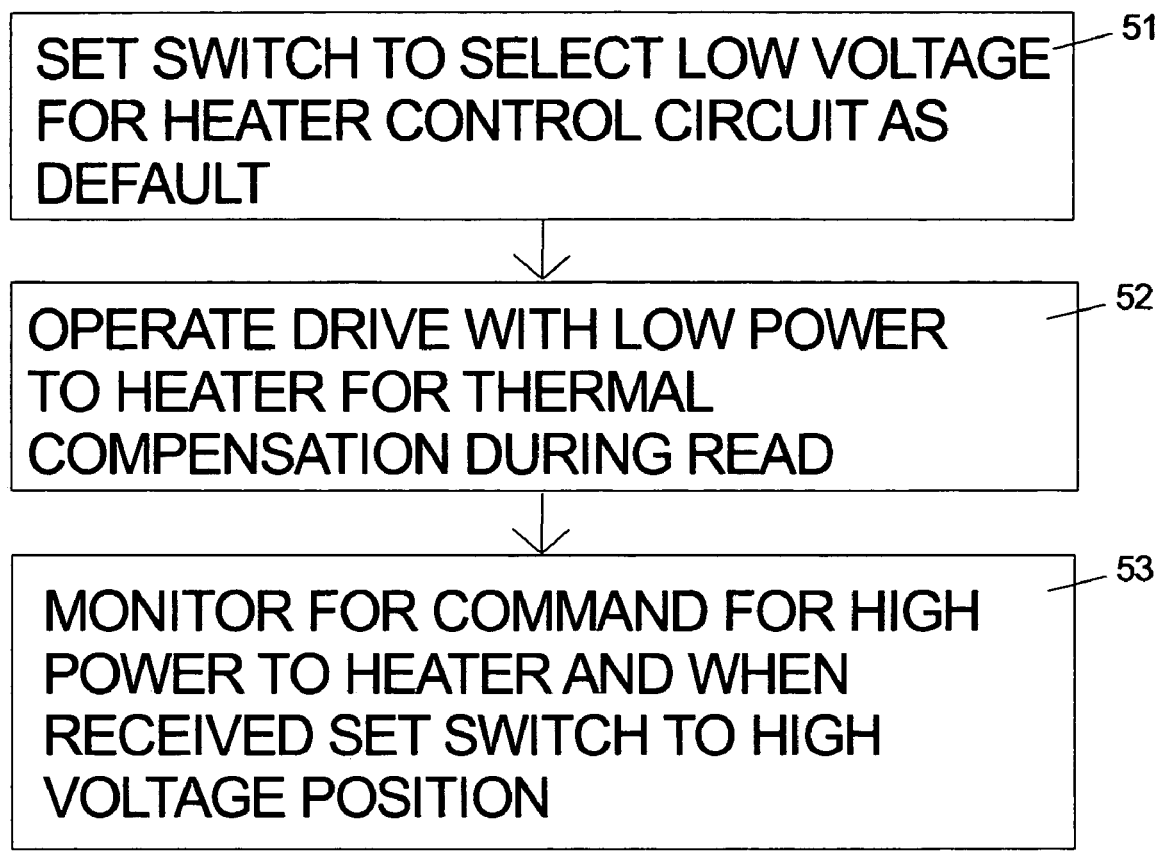
FIG. 5 is a flow chart illustrating a method of operating a disk drive with voltage switching in the heater control circuit according to the invention.

Prior art drive control systems execute many control functions automatically, but also include means for accepting commands from a host computer including commands related to testing, calibration and power management. The heater power switching of the invention is preferably integrated into the overall drive control system, so that the higher power level can be applied in the test environment or otherwise if required for a particular slider which might be out of specification. FIG. 5 is a flow chart illustrating a method of operating a disk drive with voltage switching in the heater control circuit according to the invention. Preferably the drive control system will be programmed to use the reduced power mode as the default 51. Normal read operations are preformed using the low voltage switch position 52. The drive control system monitors for commands from a host computer and switches to the high voltage for the heater when a specific command is received 53.

The invention has been described with respect to particular embodiments, but other uses and applications for the techniques according to the invention will be apparent to those skilled in the art.

The invention claimed is:

1. A disk drive comprising:
   a slider with a heater in an electrical circuit;
   an adjustable power control device in the electrical circuit connected in series with the heater to supply variable power to the heater;
   at least first and second voltage sources;
   a programmable switch in the electrical circuit which switchably connects at least a first or second path into the electrical circuit, the first path resulting in a first voltage being applied across the heater and the adjustable power control device in series and the second path resulting in a second voltage being applied across the heater and the adjustable power control device in series and the second voltage being lower than the first voltage; and
   a control system which controls the programmable switch to apply the first voltage across the heater and the adjustable power control device when high power is needed for the heater and to apply the second voltage across the heater and the adjustable power control device in series when high power is not needed for the heater.

2. The disk drive of claim 1 wherein a positive voltage is supplied to a first side of the heater and the adjustable power control device and the first path connects a negative voltage through the programmable switch and the second path connects a zero voltage through the programmable switch so that the first path results in a total voltage across the heater and the adjustable power control device equal to the positive voltage added to the negative voltage.

3. The disk drive of claim 1 wherein the first path connects a first positive power supply voltage through the programmable switch and the second path connects a second positive voltage through the programmable switch.

4. The disk drive of claim 1 wherein the control system applies the first voltage for high power during manufacturing calibration tests.

5. The disk drive of claim 1 wherein the control system applies the first voltage for high power during tests to cause the slider to contact a disk surface.

6. The disk drive of claim 1 wherein the programmable switch has a connection which cuts off power to the heater.

7. The disk drive of claim 1 wherein the programmable switch is included in an arm electronics chip.

8. A method of operating a disk drive comprising the steps of:

programming a switch in a heater control circuit to select a first voltage across an adjustable power control element and a heater in a slider connected in series when high power is needed for the heater, the first voltage resulting from section of a first voltage source in the heater control circuit; and programming the switch in the heater control circuit to select a second voltage across the adjustable power control element and a heater in a slider connected in series when low power is needed for the heater, the second voltage resulting from the inclusion of a second voltage source in the heater control circuit.

9. The method of claim 8 wherein the step of programming the switch in the heater control circuit to select the first voltage further comprises receiving a command from a host computer.

10. The method of claim 9 wherein the command from the host computer is used during manufacturing tests of the disk drive.

11. The method of claim 8 wherein the switch is in an arm electronics chip.

12. The method of claim 8 wherein the switch selects a negative voltage or a zero voltage alternatively.

13. The method of claim 8 wherein the step of programming the switch in the heater control circuit to select the second voltage a second voltage sets a switch in an arm electronics chip to connect a path into the circuit containing the power control element and the heater which applies a zero voltage through the switch.

14. The method of claim 8 wherein the step of programming the switch in the heater control circuit to select the first voltage sets a switch in an arm electronics chip to connect a path into a circuit containing the power control element and the heater which applies a first positive voltage through the switch.

15. The method of claim 8 wherein the step of programming the switch in the heater control circuit to select the second voltage sets a switch in an arm electronics chip to connect a path into the circuit containing the power control element and the heater which applies a second positive voltage through the switch.

* * * * *